United States Patent
Sayenko et al.

(10) Patent No.: US 11,019,539 B2
(45) Date of Patent: May 25, 2021

(54) METHOD AND APPARATUS FOR PROVISIONING QUALITY OF SERVICE IN NEXT RADIO

(71) Applicant: Samsung Electronics Co., Ltd., Suwon-si (KR)

(72) Inventors: Alexander Sayenko, Seoul (KR); Gert-Jan Van Lieshout, CG Apeldoorn (NL); Soenghun Kim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 16/347,553

(22) PCT Filed: Nov. 6, 2017

(86) PCT No.: PCT/KR2017/012502
§ 371 (c)(1),
(2) Date: May 3, 2019

(87) PCT Pub. No.: WO2018/084678
PCT Pub. Date: May 11, 2018

(65) Prior Publication Data
US 2019/0253938 A1    Aug. 15, 2019

(30) Foreign Application Priority Data
Nov. 4, 2016    (KR) .................. 10-2016-0146962

(51) Int. Cl.
*H04W 72/04* (2009.01)
*H04W 36/00* (2009.01)
(Continued)

(52) U.S. Cl.
CPC ... *H04W 36/0044* (2013.01); *H04W 36/0016* (2013.01); *H04W 36/0069* (2018.08);
(Continued)

(58) Field of Classification Search
CPC ......... H04W 36/0044; H04W 36/0069; H04W 36/0016; H04W 36/08; H04W 92/20; H04W 28/0268; H04W 28/0263
See application file for complete search history.

(56) References Cited

U.S. PATENT DOCUMENTS

2020/0178048 A1* 6/2020 Kim ................. H04W 48/08

FOREIGN PATENT DOCUMENTS

| KR | 10-2017-0128042 A | 11/2017 |
|---|---|---|
| WO | 2015133754 A1 | 9/2015 |
| WO | 2018/006773 A1 | 1/2018 |

OTHER PUBLICATIONS

Ericsson, Interim Agreement on Reflective QoS, Oct. 17-21, 2016, SA WG2 Meeting #117 (Year: 2016).*
(Continued)

*Primary Examiner* — Hassan Kizou
*Assistant Examiner* — Mahbubul Bar Chowdhury

(57) ABSTRACT

A communication method and system for converging a fifth generation (5G) communication system for supporting higher data rates beyond a fourth generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method of a base station for transmitting a downlink packet is provided. The method comprises generating a downlink packet including at least one of a protocol data unit (PDU) session ID or a quality of service (QoS) flow ID and transmitting the downlink packet to a user equipment (UE).

6 Claims, 26 Drawing Sheets

(51) Int. Cl.
*H04W 36/08* (2009.01)
*H04W 92/20* (2009.01)
*H04W 28/02* (2009.01)

(52) U.S. Cl.
CPC .......... *H04W 36/08* (2013.01); *H04W 92/20* (2013.01); *H04W 28/0263* (2013.01); *H04W 28/0268* (2013.01)

(56) References Cited

OTHER PUBLICATIONS

S2-165969, SA WG2 Meeting #117, Kaohsiung, Oct. 17-21, 2016, Kaohsiung, Taiwan, Ericsson (Year: 2016).*
S2-165836, SA WG2 Meeting #117 Oct. 17-21, 2016, Kaohsiung, Taiwan, Intel (Year: 2016).*
ISA/KR, "International Search Report and Written Opinion of the International Searching Authority," International Application No. PCT/KR2017/012502, dated Feb. 27, 2018, 9 pages.
Drafting Session, "Additional QoS Interim agreements," S2-163743 (revision of S2-163337 and S2-163671), SA WG2 Temporary Document, SA WG2 Meeting #116, Vienna, Austria, Jul. 11-15, 2016, 3 pages.
Ericsson, "Update of Solution 2.1: QoS functions and distribution," S2-164089 (revision of S2-163744), SA WG2 Temporary Document, SA WG2 Meeting #116, Vienna, Austria, Jul. 11-15, 2016, 11 pages.
Intel (email discussion convenor), "Summary of email discussion on QoS framework," S2-163427 (revision of S2-16xxxx), SA WG2 Meeting #116, Vienna, Austria, Jul. 11-15, 2016, 17 pages.
Samsung, "Implicit UE Requested QoS," S2-163696, SA WG2 Temporary Document, SA WG2 Meeting #115, Vienna, Austria, Jul. 11-15, 2016, 5 pages.
ZTE, ZTE Microelectronics, "Consideration on the impact of QoS on NR UP", 3GPP TSG-RAN WG2 Meeting #95bis, Oct. 10-14, 2016, R2-166336, 6 pages.
"3rd Generation Partnership Project (3GPP); Technical Specification Group (TSG) RAN; Working Group 3 (WG3); Iu Interface CN-UTRAN User Plane Protocol", TS RAN 25.415 V1.0.1 (Aug. 1999), 26 pages, R3-99A85.
Samsung, "Reducing reflective QoS processing load", 3GPP TSG-RAN WG2 Meeting #97, Feb. 13-17, 2017, 2 pages, R2-1701284.
Qualcomm Incorporated, "Considerations for reflective QoS", 3GPP TSG-RAN WG2 Meeting NR ad hoc, Jan. 17-19, 2017, 3 pages, R2-1700590.
ITRI, MediaTek Inc., "Discussion on omitting QoS flow ID", 3GPP TSG-RAN WG2 Meeting #97bis, Apr. 3-7, 2017, 2 pages, R2-1703145.
Supplementary European Search Report dated Jun. 14, 2019 in connection with European Patent Application No. 17 86 6958, 10 pages.

* cited by examiner

FIG. 17C

| 01 | C | R | R | R | R | R | R | Oct 1 |
|----|---|---|---|---|---|---|---|-------|
| QOS Id | | | | | | | | Oct 2 |
| QOS Id (cont) | | | | | | | | Oct 3 |

METHOD AND APPARATUS FOR PROVISIONING QUALITY OF SERVICE IN NEXT RADIO

CROSS-REFERENCE TO RELATED APPLICATIONS

This application is a 371 National Stage of International Application No. PCT/KR2017/012502, filed Nov. 6, 2017, which claims priority to Korean Patent Application No. 10-2016-0146962, filed Nov. 4, 2016, the disclosures of which are herein incorporated by reference in their entirety.

BACKGROUND

1. Field

The present disclosure relates to the Next Radio (NR) technology. More particularly, the present disclosure relates to a Long Term Evolution (LTE) light connection feature, a LTE enhanced mobility feature, and a quality of service (QoS) model applicable for the NR "5G" technology. The present disclosure can be in principle applicable for the being standardized NR "5G" technology if the same or similar enhanced mobility procedure is adopted there.

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) system'. The 5G communication system is considered to be implemented in higher frequency (mm-Wave) bands, e.g. 60 GHz bands, so as to accomplish higher data rates. To decrease propagation loss of the radio waves and increase the transmission distance, beamforming, massive multiple-input multiple-output (MIMO), full dimensional MIMO (FD-MIMO), array antenna, analog beam forming, and large scale antenna techniques are discussed in 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM) modulation (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology," "wired/wireless communication and network infrastructure," "service interface technology," and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

SUMMARY

The aspect of the invention is that user equipment (UE) can be assigned the radio access network (RAN) paging area ID, which is broadcast in the system information, and the explicit list of cells.

And, the aspect of the invention is that the network relies upon the UE carrier aggregation capabilities to determine when the enhanced handover can be applied.

Further, the aspect of the invention is to extend new radio (NR) Uu/radio interface to support the NR/5G flow based quality of service (QoS) model.

In accordance with a first aspect of the present disclosure, a method according to which a UE can receive both radio access network (RAN) area ID and the explicit list of cells is provided. The UE constructs internally one paging area comprising cells belonging to the area ID and the cells provided in the explicit list, and applies and follows all the paging area procedures to cells belonging to the area ID and the cells provided in the explicit list.

In accordance with a second aspect of the present disclosure, a method according to which the network can provide both RAN area ID and the explicit list of cells is provided. The network determines when an explicit list of cells should be provided, and makes a decision to provide the explicit list of cells is based on the fact whether neighbor network entities belong to the same paging area and whether there are direct connections to the aforementioned neighbors.

In accordance with a third aspect of the present disclosure, a method for the network side (e.g. eNB) to decide which handover type—legacy or the enhanced one—should be applied depending on a particular case is provided. An eNB receives and analyzes UE carrier-aggregation capabilities to make a decision whether the enhanced mobility procedure can be activated. The eNB may analyze 2DL intra-band carrier aggregation capabilities to build a list of bands where intra-frequency or intra-band/inter-frequency handover can be applied. The eNB may analyze 2DL inter-band carrier aggregation capabilities to build a list of band pairs where inter-band/inter-frequency handover can be applied.

In accordance with a fourth aspect of the present disclosure, a method according to which the UE receives the re-configuration message including an enhanced mobility indicator is provided. The UE checks whether the provided configuration is valid for the given scenario. The UE either accepts or rejects the configuration message depending on whether the aforementioned validity check has passed or failed.

In accordance with a fifth aspect of the present disclosure, a method of a base station for transmitting a downlink packet is provided. The method comprises generating a downlink packet including at least one of a protocol data unit (PDU) session ID or a quality of service (QoS) flow ID and transmitting the downlink packet to a user equipment (UE).

In accordance with a sixth aspect of the present disclosure, a base station comprising a transceiver configured to receive signals from a user equipment (UE) and transmit signals to the UE, and a controller coupled with the transceiver is provided. The controller is configured to generate a downlink packet including at least one of a protocol data unit (PDU) session ID or a quality of service (QoS) flow ID and control the transceiver to transmit the downlink packet to the UE.

In accordance with a seventh aspect of the present disclosure, a method of a user equipment (UE) for receiving a downlink packet is provided. The method comprises receiving a downlink packet including at least one of a protocol data unit (PDU) session ID or a quality of service (QoS) flow ID from a base station, and decoding the downlink packet.

In accordance with an eighth aspect of the present disclosure, a user equipment (UE) comprising a transceiver configured to receive signals from a base station and transmit signals to the base station, and a controller coupled with the transceiver is provided. The controller is configured to control the transceiver to receive a downlink packet including at least one of a protocol data unit (PDU) session ID or a quality of service (QoS) flow ID from the base station, and decode the downlink packet.

The present disclosure allows a network to virtually extend a radio access network (RAN) paging area with eNBs to which an anchor eNB has a direct X2 connection.

The present disclosure allows a network control element to know in which case the enhanced handover procedure can be activated for a user equipment (UE).

Overhead over Uu interface is reduced by selectively including protocol data unit (PDU) session ID and quality of service (QoS) flow ID.

BRIEF DESCRIPTION OF THE DRAWINGS

FIGS. 13a and 3b show the new functionality for NR QoS handing on top of existing DRB functionality;

FIGS. 17a, 17b, 17c and 18 present potential ASML header formats conveying PDU session ID, QoS flow ID, and the reflective QoS indicators;

DETAILED DESCRIPTION

Figure 1:
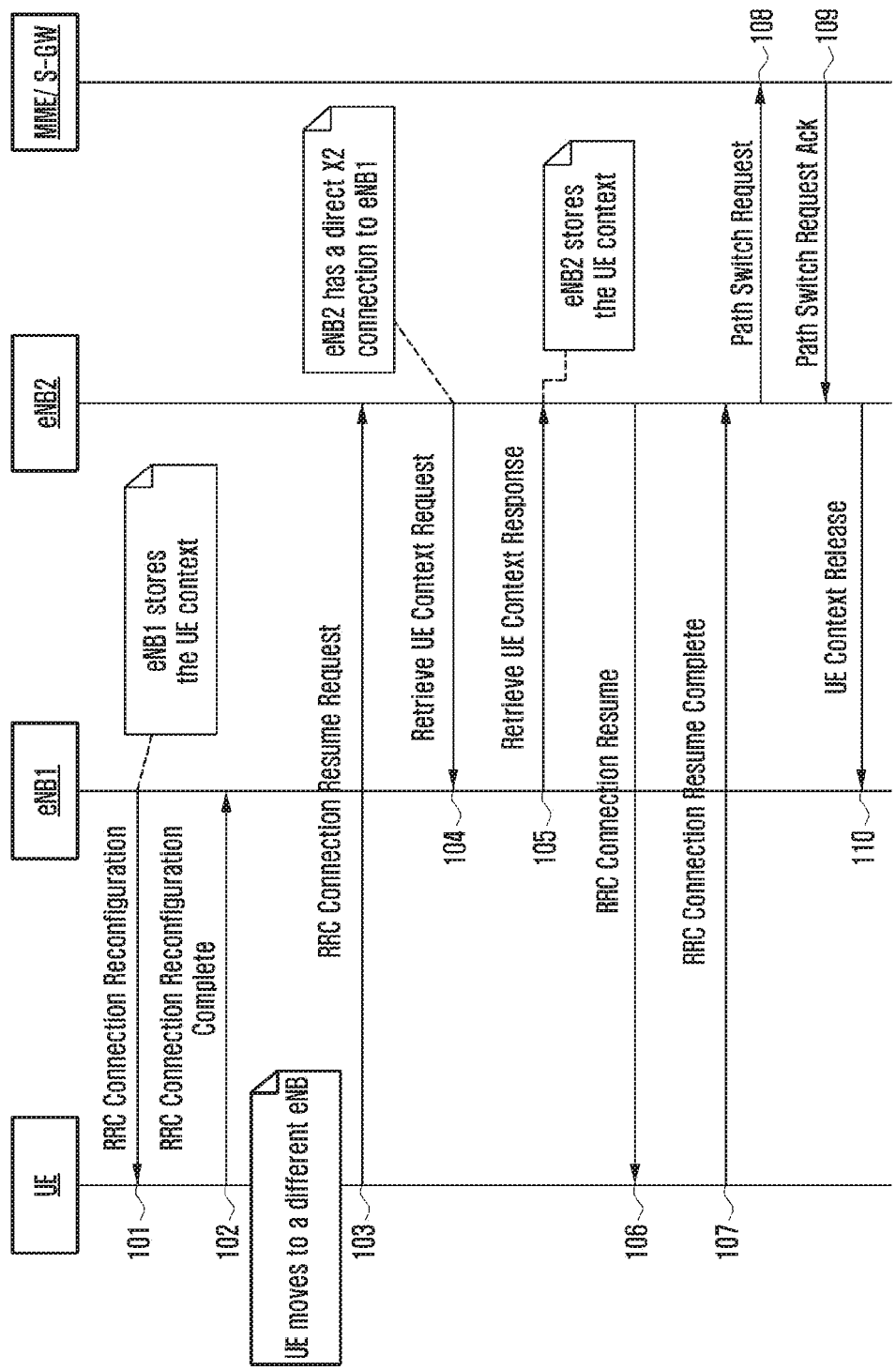
FIG. 1 presents an exemplary user equipment (UE) context fetch procedure when the anchor and the target eNB have a direct X2 connection.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out steps of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit," "module" or the like may refer to a software component or hardware component, such as, for example, a field-programmable gate array (FPGA) or an application-specific integrated circuit (ASIC) capable of carrying out a function or an operation. However, a "unit," or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Embodiment 1

Being standardized Long Term Evolution (LTE) Light Connection feature aims at achieving a good trade-off between the UE power consumption and the amount of time it takes a user equipment (UE) to move to the CONNECTED mode. The way it is achieved is that a UE is re-configured to the special "light connection" mode, in which a UE behavior is almost identical to the IDLE state, including measurements. At the same time, a UE keeps its access stratum (AS) context and the network keeps the S1 connection (between mobility management entity (MME) and eNB), so that a UE can move quickly to the CONNECTED mode when uplink (UL)/downlink (DL) data arrives.

A UE configured with the "light connection" mode performs autonomous cell re-selection procedure as in the IDLE state, i.e. it moves on its own from one cell to another. To avoid unnecessary control signaling associated with transitions from one cell to another, a UE location is known at the level of the so-called radio access network (RAN) paging area. In other words, as long as a UE stays within boundaries of a particular area, it does not send any indication to the network. Depending on the network configuration, the paging area can be as small as one cell, or as large as the whole tracking area update (TAU) tracking area. The most typical/anticipated configuration is that the RAN paging area comprises several cells, but is still smaller when compared to the whole TAU area.

One of the related problems for the LTE Light Connection feature is how to define the aforementioned RAN paging area. One of the major and the simplest approaches is to adopt solution similar to the universal mobile telecommunications system (UMTS) URA_PCH, i.e. let every cell broadcast a special RAN paging ID, whereupon cells belonging to the same area have the same paging ID. However, the UMTS system has a central node called radio network controller (RNC) which keeps the UE context, so regardless of a cell within the same paging area where a UE can move, the context is always in the same place. In LTE, the UE context is kept in eNB, so whenever a UE moves from one eNB to another eNB, even within the same paging area, the UE context must be fetched upon mobile-originated or mobile-terminated calls. In turn, depending on whether there is a direct X2 connection between the previous (hence anchor) and a new (hence target) eNB, different signaling messages are exchanged between network elements.

FIG. 1 presents an exemplary UE context fetch procedure when the anchor and the target eNB have a direct X2 connection.

Referring to FIG. 1, an anchor eNB (i.e. eNB1) transmits an RRC connection reconfiguration message to UE at operation 101. As mentioned above, an anchor eNB in LTE stores a UE context. In response to RRC connection reconfiguration message at operation 101, UE transmits an RRC connection reconfiguration compete message to eNB1 at operation 102.

If UE moves to a different eNB (i.e. a target eNB), UE transmits an RRC connection resume request message to the target eNB (i.e. eNB2) at operation 103. If eNB2 has a direct X2 connection to eNB1, eNB2 transmits a UE context request message to eNB1 to fetch the UE context at operation 104. In response, eNB1 transmits a UE context response message including the UE context to eNB2 at operation 104. Accordingly, eNB2 can acquire and store the UE context.

In response to the RRC connection resume request message at operation 103, eNB2 transmits an RRC connection resume message to UE at operation 106, and UE transmits an RRC connection resume complete message at operation 107. ENB2 transmits a path switch request message to MME/serving gateway (S-GW) at operation 108, and MME/S-GW acknowledges the path switch request message at operation 109. ENB2 transmits a UE context release message to eNB1 at operation 110.

As can be seen from FIG. 1, if there is a direct X2 connection between the anchor eNB and the target eNB, the overall number of signaling messages is relatively small which are constrained to the X2 interface.

Figure 2:
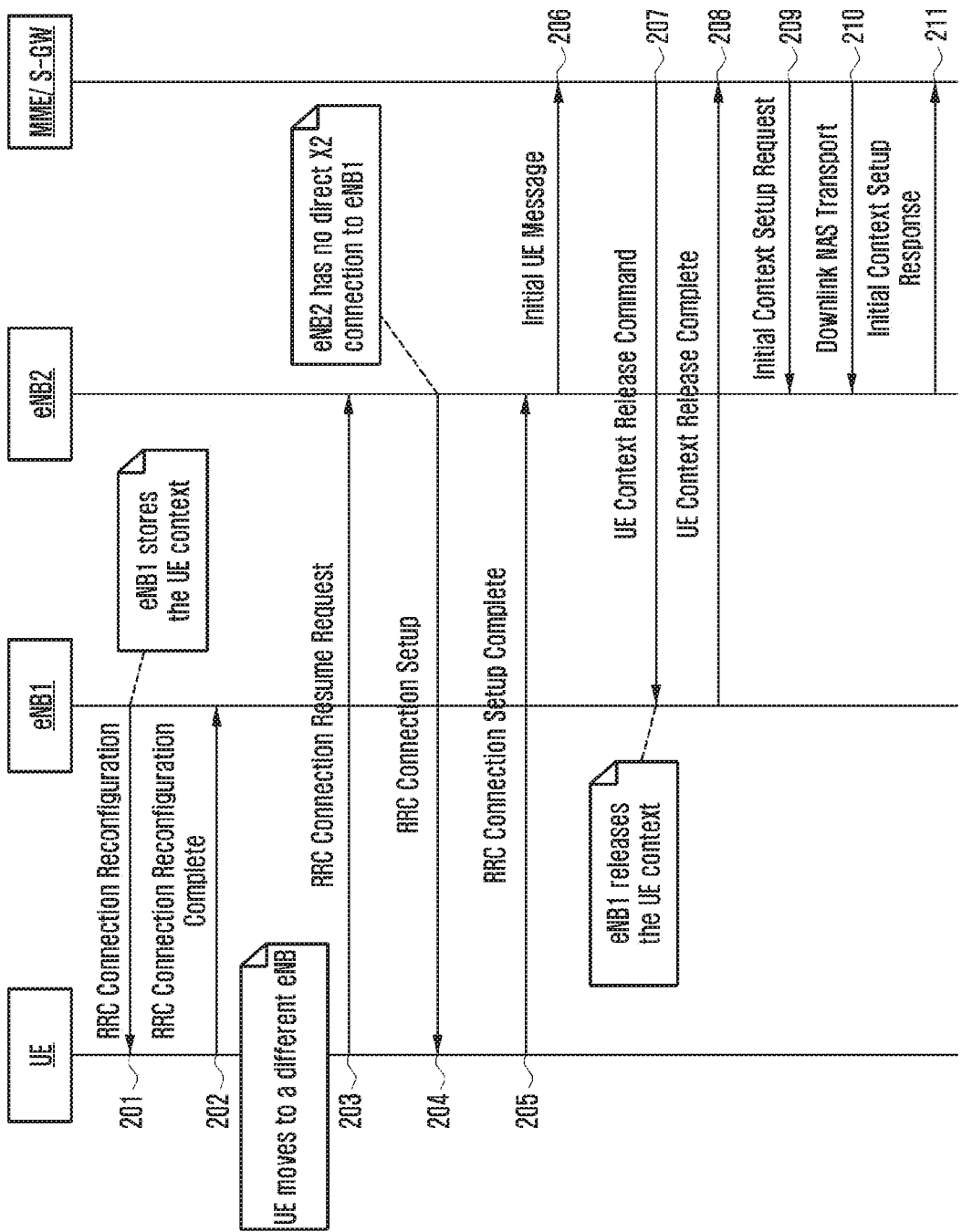
FIG. 2 presents an exemplary UE context fetch procedure when the anchor and the target eNB do not have a direct X2 connection.

FIG. 2 presents an exemplary UE context fetch procedure when the anchor and the target eNB do not have a direct X2 connection.

Similar to FIG. 1, an anchor eNB (i.e. eNB1) transmits an RRC connection reconfiguration message to UE at operation 201, and UE transmits an RRC connection reconfiguration compete message to eNB1 at operation 202. If UE moves to a different eNB (i.e. a target eNB), UE transmits an RRC connection resume request message to the target eNB (i.e. eNB2) at operation 203.

On the contrary to FIG. 1, if eNB2 has no direct X2 connection to eNB1, eNB2 transmits an RRC connection setup message to UE at operation 204. In response, UE transmits an RRC connection setup complete message to eNB2 at operation 205. ENB2 transmits an initial UE message to MME/S-GW at operation 206. MME/S-GW transmits a UE context release command to eNB1 at operation 207. In response, ENB1 releases the UE context, and transmit a UE context release complete message to MME/S-GW at operation 208. MME/S-GW transmits an initial context setup request message and a downlink non access stratum (NAS) transport message to eNB2 at operations 209 and 210, and eNB2 transmits an initial context setup response message to MME/S-GW at operation 211.

Referring to FIG. 2, if there is a need to fetch the UE context from the eNB to which no direct X2 connection exists, the network resorts to relying upon the S1 interface resulting in more signaling messages. Thus, from the viewpoint of the number of the control signaling, all the eNBs should ideally have direct X2 connections, which is of course not the case in the real life.

With regards to the number of the control signaling messages issue mentioned above, one can consider two major distinctive approaches on how the RAN paging area is defined and configured. One approach is to follow the UMTS solution, according to which cells are just grouped based on some principle (specified by the operator) into the same area. It allows building large areas, but there could be cases when a UE moving within that area ends up to the eNB with no X2 connection the anchor eNB, whereupon S1 control signaling is needed.

Figure 3:
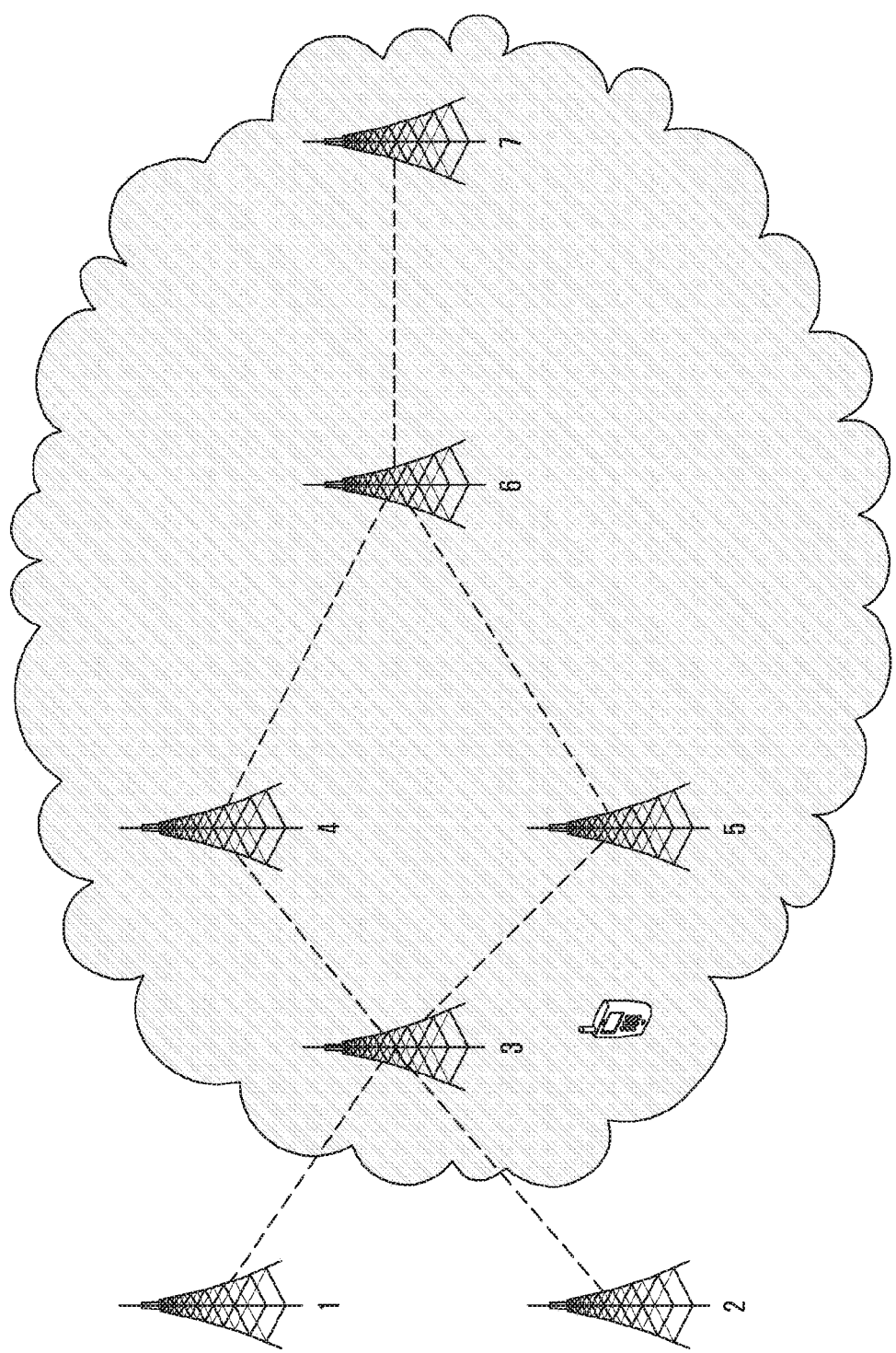
FIG. 3 presents an exemplary network topology with the radio access network (RAN) paging area defined by means of the ID broadcast in the system information and including eNB with/without direct X2 connection.

FIG. 3 presents an exemplary network topology with the RAN paging area defined by means of the ID broadcast in the system information and including eNB with/without direct X2 connection.

Referring to FIG. 3, if a UE is configured by eNB #3 with the RAN area comprising eNB #3-7, then if a UE moves to eNB #7, eNB #7 will require S1 signaling to fetch the UE context from eNB #3.

Figure 4:
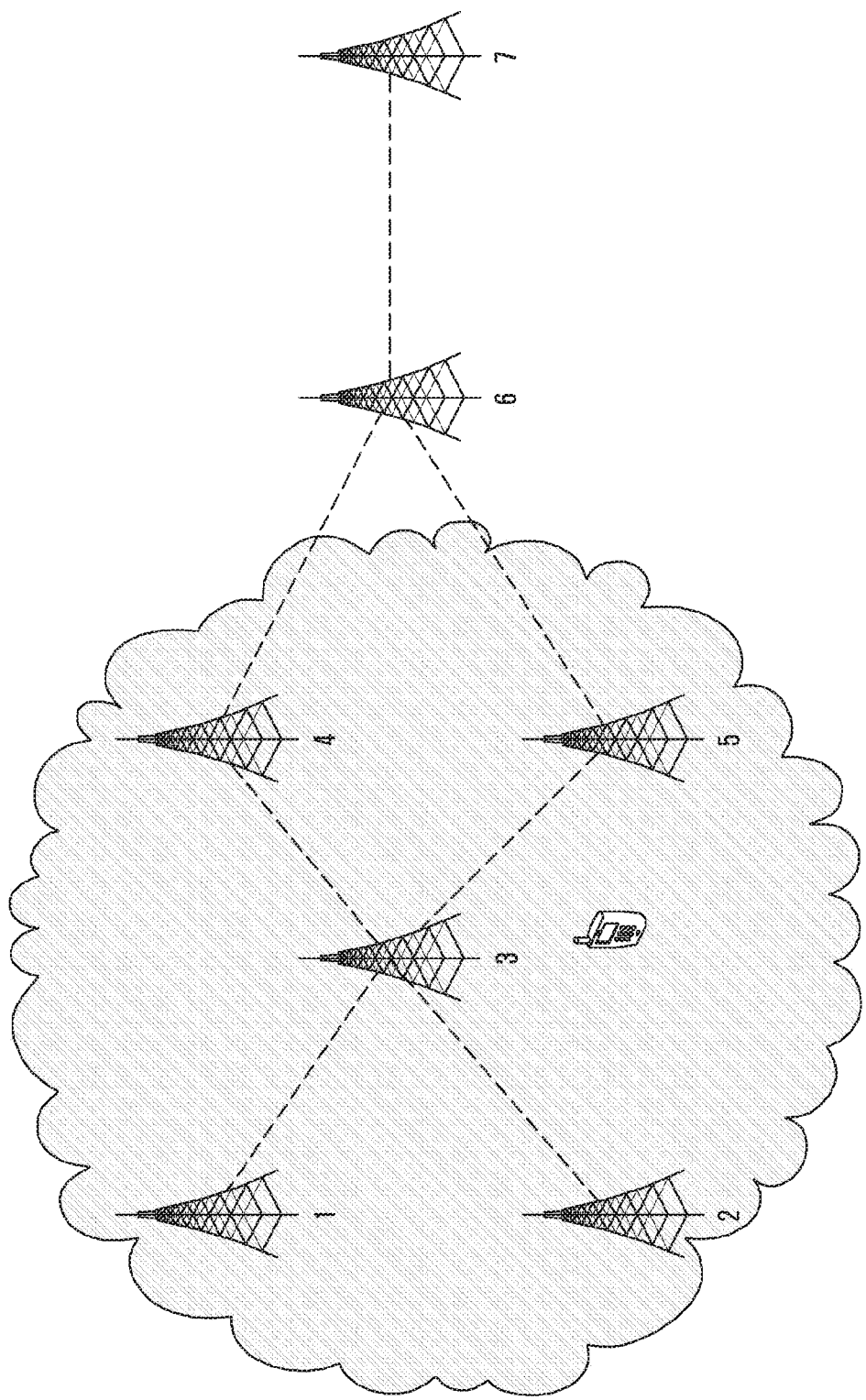
FIG. 4 presents an exemplary network topology with the RAN paging area defined by the explicit list of cells and including only neighbor eNBs.

FIG. 4 presents an exemplary network topology with the RAN paging area defined by the explicit list of cells and including only neighbor eNBs.

A completely different approach is illustrated in FIG. 4, in which eNB #3 provides an explicit list of cells comprising the RAN area, whereupon the eNB signals those cells to which it has direct X2 connection. Referring to FIG. 4, eNB #3 signals a list with eNB #1-4. However, the downside of this approach is that the resulting RAN area size will be small, which in turn means that when a UE moves from one cell to another potentially crossing multiple areas, it may result in increased S1 signaling just because of the UE movement.

As can be seen from explanations in the previous paragraph, both methods have advantages and drawbacks. A solution with the RAN paging ID broadcast in the system information allows for building larger areas and can eliminate unnecessary S1 signaling while a UE moves across a large area, but it fails to address properly a case when a UE ends up to the RAN paging area border. A solution with the explicit list of cells solves an issue with the area border because the paging area is built around the UE, but it is not possible to build a large area thus potentially resulting in increased S1 signaling when a UE moves.

Accordingly, the present disclosure proposes that both methods are combined so that a UE can be assigned the RAN paging area ID (which is broadcast in the system information) and the explicit list of cells.

Figure 5:
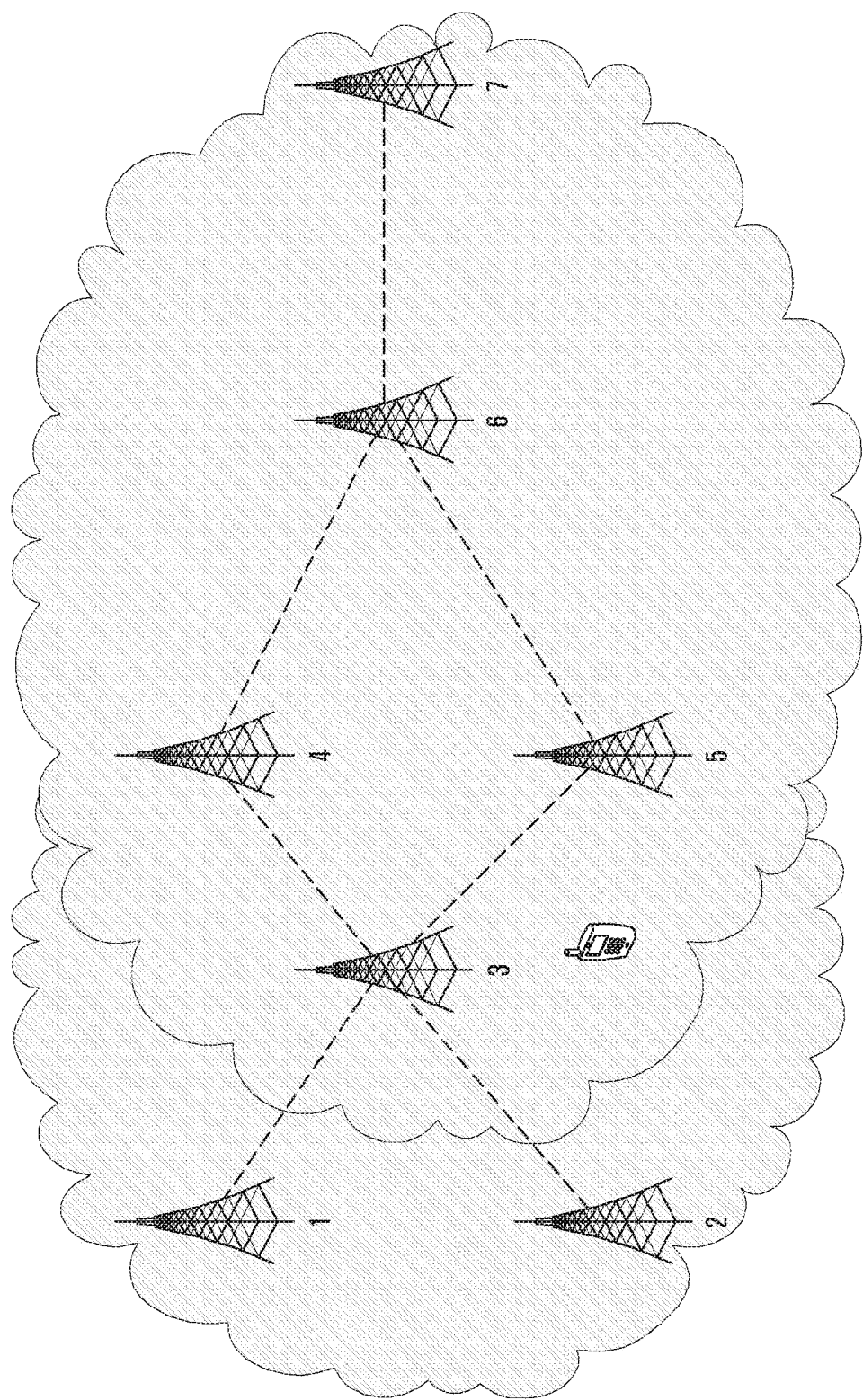
FIG. 5 presents an exemplary network topology with the RAN paging area defined by both the area ID and the explicit list of cells.

FIG. 5 presents an exemplary network topology with the RAN paging area defined by both the area ID and the explicit list of cells.

Referring to FIG. 5, a UE is under the control of eNB #3. When that eNB decides to re-configure a UE to the light connection mode (e.g. as a result of the expiry of the inactivity timer), it can provide both the area ID and the explicit list of cells. The area ID typically comes from the operator preferences, and in this particular example the area comprises eNB #3-7. In addition, since eNB #3 has two neighbors eNB #1-2, which are not part of the area ID, those eNBs can be signaled to the UE in the additional list with explicit IDs. As a result, from the UE perspective there is one "merged" area that comprises both eNB #3-7 and eNB #1-2. It should be also noted that if the UE in FIG. 5 had been under eNB #6, then no additional cells would have been provided to the UE because its neighbors, eNB #4-5,7 are already under the same RAN paging area.

Figure 6:
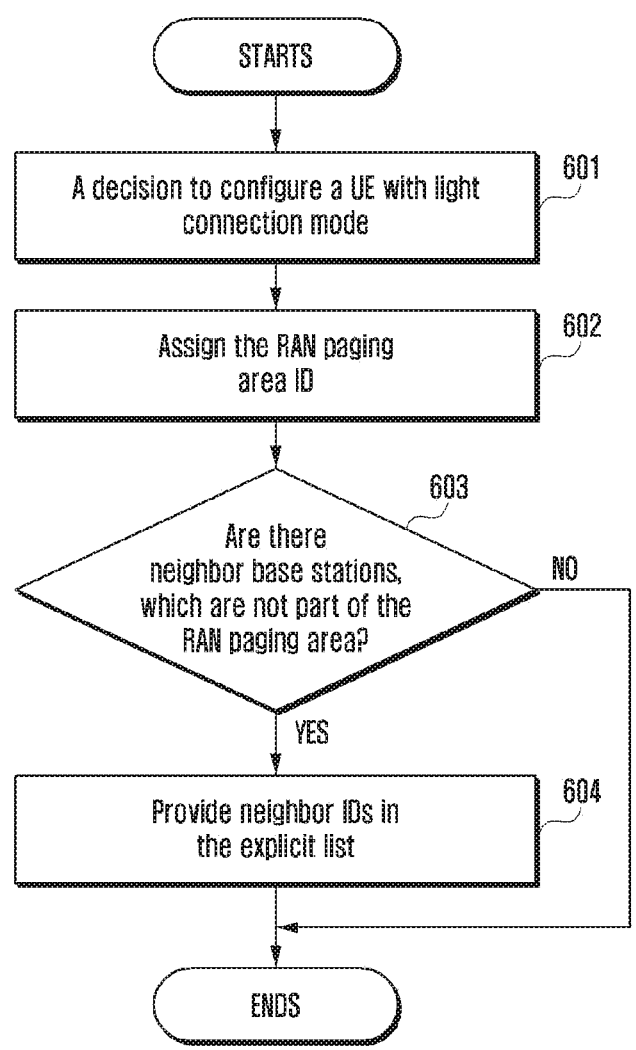
FIG. 6 illustrates an eNB algorithm for building a list with additional explicit cell IDs according to an embodiment of the present disclosure.

FIG. 6 illustrates an eNB algorithm for building a list with additional explicit cell IDs according to an embodiment of the present disclosure. From the network-side perspective, the eNB algorithm for configuring a UE may look as follows.

Referring to FIG. 6, an eNB makes a decision to re-configure a UE to the light connection mode at operation 601, and assigns a UE with a particular RAN area ID at operation 602. The RAN area ID may be determined by the operator.

At operation 603, the eNB checks whether there are eNB neighbors, to which there exists X2 connection but which are not part of the area ID assigned at operation 602. If so, then the eNB signals those neighbors in the additional list with explicit IDs at operation 604.

As an outcome of the solution from the previous paragraphs, if a UE moves to eNB #1 or eNB #2, then it will not generate any area change to the network. Furthermore, if a UE moves to eNB #1 or eNB #2 at mobile-terminated or mobile-originated call takes place, then a UE context will be fetched from eNB #2 by using only X2 signaling without resorting to S1 interface.

According to Embodiment 1 of the present disclosure, a network can provide both RAN area ID and the explicit list of cells, and a UE can receive both the RAN area ID and the explicit list of cells. The network determines when an explicit list of cells should be provided, and makes a decision to provide the explicit list of cells is based on the fact whether neighbor network entities belong to the same paging area and whether there are direct connections to the aforementioned neighbors. The UE constructs internally one paging area comprising cells belonging to the area ID and the cells provided in the explicit list, and applies and follows all the paging area procedures to cells belonging to the area ID and the cells provided in the explicit list.

Embodiment 2

The 4G/LTE system, as any wireless system, relies upon the concept of a cell whereupon a UE exchanging data with the wireless network is associated at least with one cell (a UE can be associated with more than one cell in COMP/Multiflow-like scenarios). However, as each cell has a finite coverage and a UE tends to move, sooner or a later a UE will resort to re-associating itself with a different cell, which is typically referred to as the handover procedure.

The handover does not happen instantaneously and usually involves a number of steps and procedures at different layers. As a non-limiting example, a UE has to process the re-configuration command from the network, prepare the lower layers, break communication to the current cell, synchronize and tune its RF receiver to the target cell, and finally complete the handover process by sending a "compete" indication to the target cell. In case of the LTE technology, all these steps make take up to 50 ms, which may cause data interruption and performance degradation.

Figure 7:
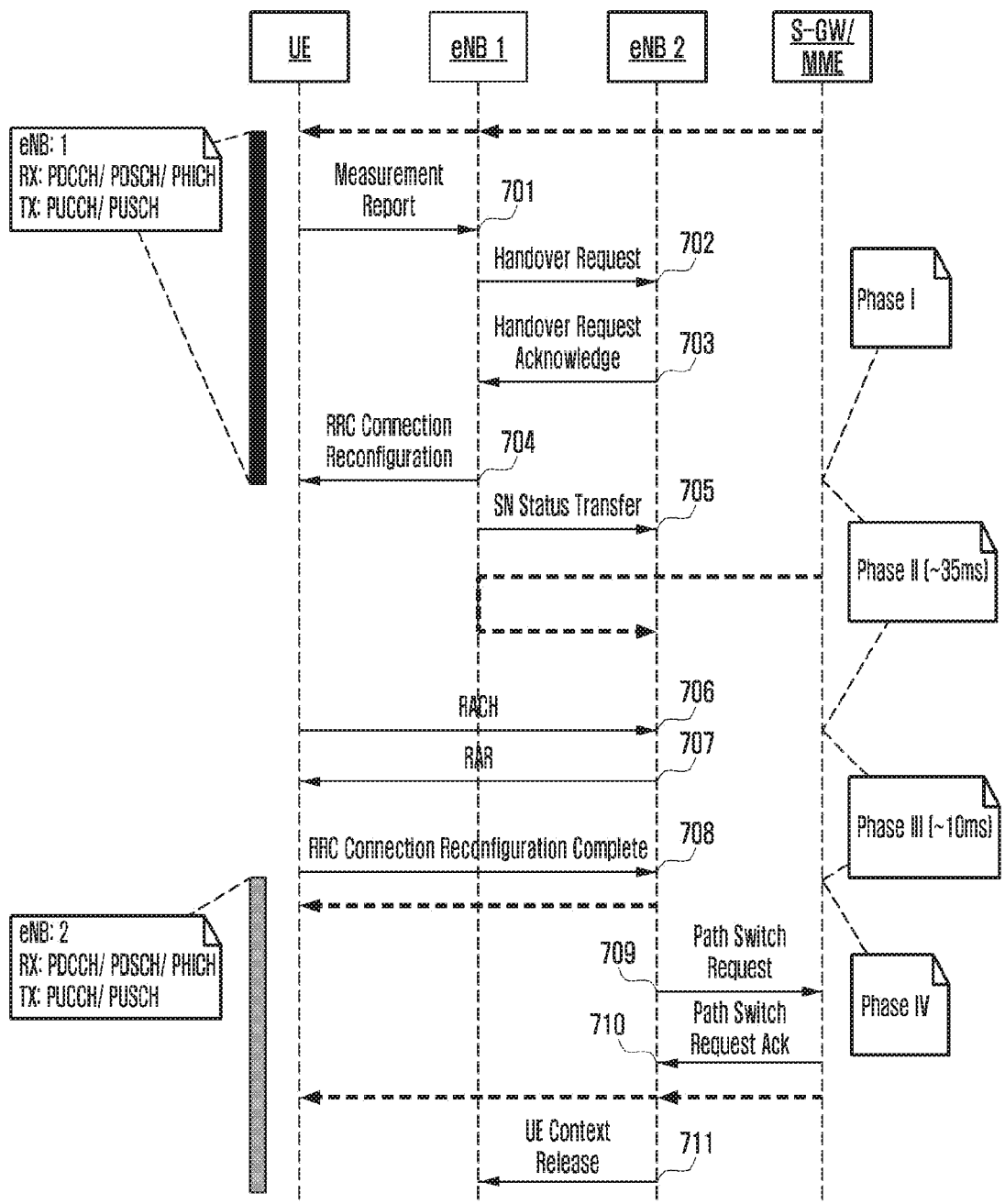
FIG. 7 presents a signaling diagram for a legacy handover procedure.

FIG. 7 presents a signaling diagram for the legacy handover procedure. FIG. 7 also indicates when user plane data transmission can take place.

Referring to FIG. 7, UE sends a measurement report to a source eNB (i.e. eNB1) at operation 701. ENB1 issues a handover request message to a target eNB (i.e. eNB2) passing necessary information to prepare the handover at the target side at operation 702. ENB2 sends a handover request acknowledge to eNB1 at operation 703. The handover request acknowledge message includes a transparent container to be sent to UE as an RRC connection reconfiguration message to perform the handover. ENB1 sends the RRC connection reconfiguration message with necessary parameters to UE at operation 704.

ENB1 sends a sequence number (SN) status transfer to eNB2 to convey the uplink packet data convergence protocol (PDCP) SN receiver status and the downlink PDCP SN transmitter status of evolved universal terrestrial radio access network radio access bearers (E-RABs) for which PDCP status preservation applies at operation 705.

Meanwhile, after receiving the RRC connection reconfiguration message at operation 704, UE performs synchronization to eNB2 and accesses the target cell via RACH at operation 706. ENB2 sends a random access response (RAR) to UE to respond with UL allocation and timing advance at operation 707. When UE has successfully accessed the target cell, UE sends an RRC connection reconfiguration complete message to confirm the handover to eNB2 at operation 708.

ENB2 sends a path switch request message to MME to inform that UE has changed cell at operation 709. MME confirms the path switch request message with a path switch request acknowledge message at operation 710. By sending a UE context release message to eNB1 at operation 711, eNB2 informs success of the handover to eNB1 and triggers the release of resources by eNB1. ENB2 sends this message after the path switch request acknowledge message is received from MME at operation 710.

One can see an interruption delay at Phase II of FIG. 7, which corresponds to operations 704-706, caused by the re-configuration message processing and radio frequency (RF) sync/tuning.

In response to the handover interruption delays described above, the 3rd Generation Partnership Project (3GPP) community has been standardizing a new feature called "mobility enhancement," which in particular allows a UE to continue to exchange data with its current eNB while performing RF sync/tuning to the target.

Figure 8:
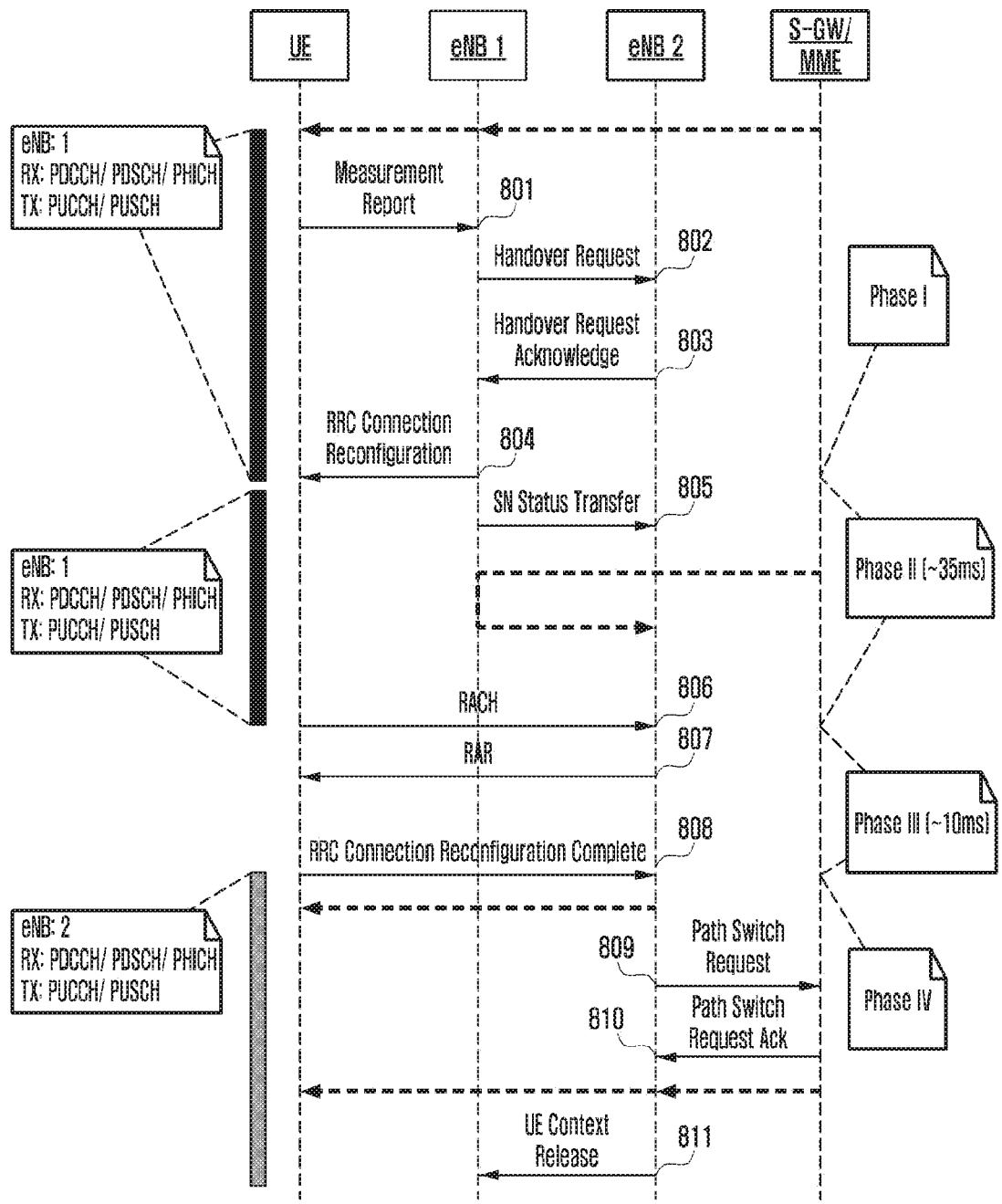
FIG. 8 presents a signaling diagram for an enhanced handover procedure.

FIG. 8 presents a signaling diagram for an enhanced handover procedure. FIG. 8 also indicates when user plane data transmission can take place.

Similar to a legacy handover procedure illustrated in FIG. 7, UE sends a measurement report to a source eNB (i.e. eNB1), eNB1 sends a handover request message to a target eNB (i.e. eNB2), eNB2 sends a handover request acknowledge to eNB1, eNB1 sends a RRC connection reconfiguration message to UE, eNB1 sends a SN status transfer to eNB2, UE accesses a target cell via RACH, eNB2 sends a RAR to UE, UE sends an RRC connection reconfiguration complete message to eNB2, eNB2 sends a path switch request message to MME, MME sends a path switch request acknowledge message to eNB2, and eNB2 sends a UE context release message to eNB1 at operations 801 to 811.

On the contrary to the legacy handover procedure illustrated in FIG. 7, one can see that a UE continues to communicate to the source while preparing itself for the communication with the target. The enhanced mobility process illustrated in FIG. 8 is the one being standardized for LTE; and it might be also considered for the Next Radio (5G) technology for exactly the same reason.

Referring to FIG. 8, when the source eNB issues the re-configuration command, it has to decide whether a legacy or the enhanced handover procedure will be instructed to the UE. The problem is that while activating the enhanced mobility procedure, the network simply needs to know whether a UE can support it for a particular scenario. As an example, the handover type can be intra-frequency, intra-band inter-frequency, or inter-band inter-frequency. The matter is that to achieve simultaneous and independent communication with the source and syncing to the target, a UE will most likely need more than one RF chain. Even if we assume/know that a UE has two RF chains, it is still might be too opportunistic to assume that UE hardware will be able to use these RF chains in all the handover cases.

Thus, from the network-side perspective, the network control element, i.e. eNB in case of the LTE system, needs to know in which case the enhanced handover procedure can be activated for the UE.

To allow the network to decide in which case the enhanced handover can be applied, the present disclosure suggests relying upon the UE carrier-aggregation capabilities. The premise rationale behind this approach is that if a UE, according to its capabilities, can perform at least 2DL carrier-aggregation, then it means that a UE already has two RF chains. Furthermore, if a UE indicates that it supports 2DL carrier-aggregation for a certain scenario (e.g. intra-band), then it means that UE hardware supports and was tested for the simultaneous operation for that scenario.

Table 1 presents a sample set of the UE carrier-aggregation capabilities. Table 1 for the sake clarify are stripped down to 2DL carrier aggregation combinations and cover only 3 frequency bands (letters a,b,c refer to the bandwidth size).

TABLE 1

| Band-1 | BandwidthClass DL-r10 | BandwidthClass UL-r10 | Band-2 | BandwidthClass DL-r10 | BandwidthClass UL-r10 |
|---|---|---|---|---|---|
| 7 | a | A | 1 | a | |
| 7 | a | | 1 | a | a |
| 3 | a | A | 1 | a | |
| 3 | a | | 1 | a | a |
| 1 | c | A | | | |
| 7 | a | A | 3 | a | |
| 7 | a | | 3 | a | a |

TABLE 1-continued

| Band-1 | BandwidthClass DL-r10 | BandwidthClass UL-r10 | Band-2 | BandwidthClass DL-r10 | BandwidthClass UL-r10 |
| --- | --- | --- | --- | --- | --- |
| 3 | a | A | 3 | a | |
| 3 | c | A | | | |
| 7 | a | A | 7 | a | |
| 7 | c | A | | | |
| 7 | b | A | | | |

Referring to Table 1:
1. a UE supports 2DL intra-band carrier aggregation for band 3;
2. a UE supports 2DL intra-band carrier aggregation for band 7;
3. a UE does not support 2DL intra-band carrier aggregation for a band 1;
4. a UE supports 2DL inter-band carrier aggregation for a band pair (7,1);
5. a UE supports 2DL inter-band carrier aggregation for a band pair (3,1);
6. a UE supports 2DL inter-band carrier aggregation for a band pair (3,7);

According to items 1-2 above, if a UE is served by the source eNB on a frequency band 3 or 7, then the network can enable enhanced handover for the intra-frequency or intra-band/inter-frequency handover because UE hardware can tune two RF chains to the same band. At the same time, according to item 3, if a UE is camped on the frequency band 1, then it is not possible to activate enhanced mobility procedure as a UE does not indicate the corresponding carrier aggregation capability for that band.

Following the same principle, items 4-6 indicate that if a UE is camped on band 1, 3, or 7, then the network can enable the enhanced mobility procedure for the inter-band inter-frequency handover for any of the aforementioned bands as the target one.

During the UE's initial registration to the network, it will report its radio capabilities to eNB, which also includes the carrier aggregation capabilities. Once the eNB knows them, it can decide whether the enhanced handover mechanism can be applied to this UE during a particular scenario, e.g. intra-frequency handover, intra-band/inter-frequency, or inter-band. The corresponding indicator will be conveyed to the UE in the RRC re-configuration message triggering the actual handover.

Figure 9:
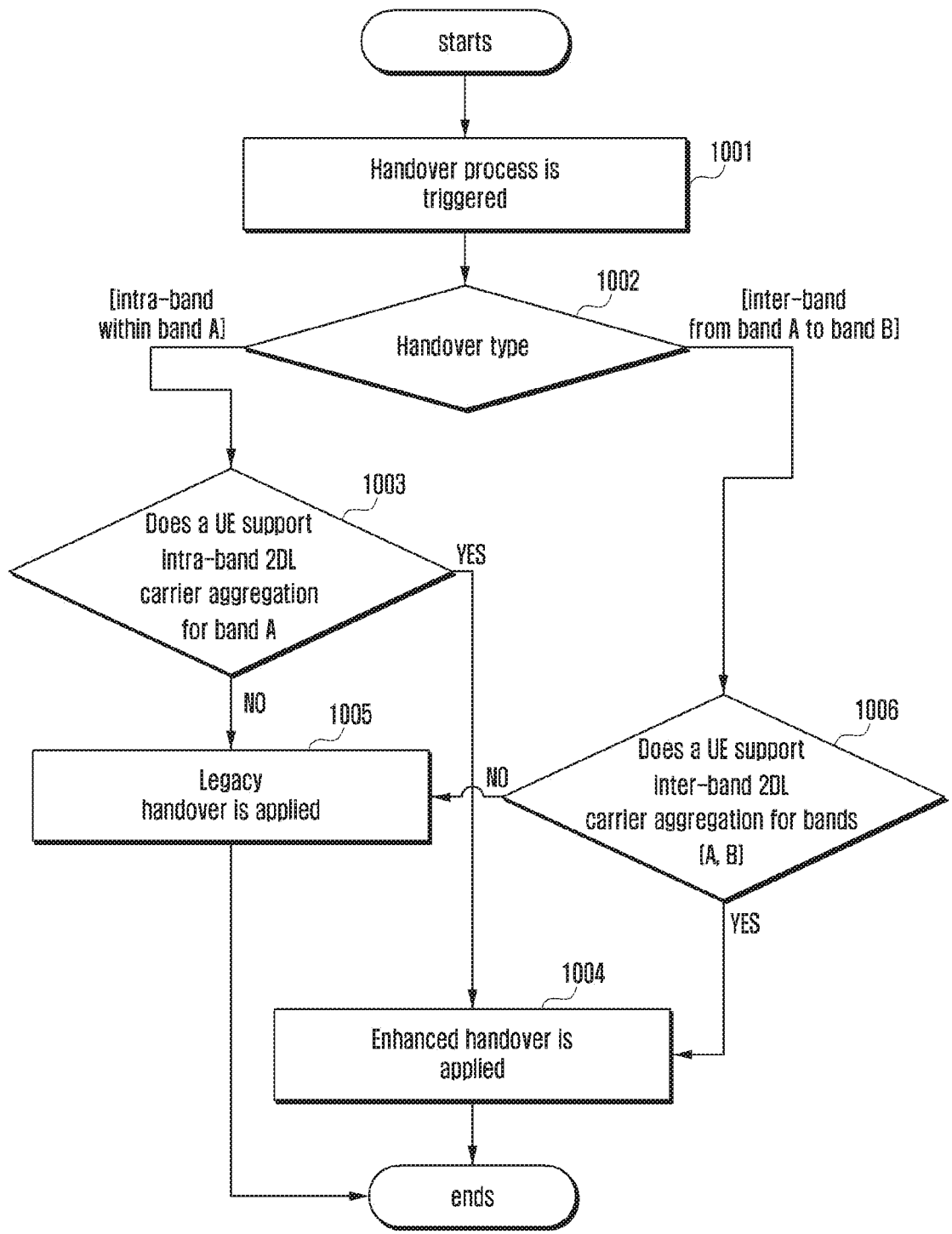
FIG. 9 presents a diagram for the network actions to decide which handover type should be selected.

FIG. 9 presents a diagram for the network actions to decide which handover type should be selected.

Referring to FIG. 9, if handover process is triggered at operation 1001, eNB identifies which handover type is triggered at operation 1002.

If an intra-band within band A is triggered, eNB analyzes whether UE supports intra-band 2DL carrier aggregation for band A at operation 1003. If so, an enhanced handover is applied at operation 1004. Otherwise, a legacy handover is applied at operation 1005.

If an inter-band from band A to band B is triggered, eNB analyzes whether UE supports inter-band 2DL carrier aggregation for bands (A, B) at operation 1006. If so, an enhanced handover is applied at operation 1004. Otherwise, a legacy handover is applied at operation 1005.

According to Embodiment 2 of the present disclosure, an eNB receives and analyzes UE carrier-aggregation capabilities to make a decision whether the enhanced mobility procedure can be activated. The eNB may analyze 2DL intra-band carrier aggregation capabilities to build a list of bands where intra-frequency or intra-band/inter-frequency handover can be applied. The eNB may analyze 2DL inter-band carrier aggregation capabilities to build a list of band pairs where inter-band/inter-frequency handover can be applied. A UE receives a re-configuration message including an enhanced mobility indicator. The UE may check whether the provided configuration is valid for the given scenario. The UE may either accept or reject the configuration message depending on whether the aforementioned validity check has passed or failed. The UE may perform the validity check based on the given scenario following the aforementioned rules and principles associated with the UE carrier-aggregation capabilities.

Embodiment 3

The NR/S5G radio access technology has several distinctive features when compared to LTE/4G, and one of them is a new quality of service (QoS) model. While in the LTE radio access technology there are evolved packet system (EPS) bearers in the core network and radio bearers on the radio network with one-to-one mapping between them, the NR core network has only QoS flows. Each QoS flow can represent a particular transmission control protocol (TCP)/user datagram protocol (UDP) session or a collection of them. It is up to the core network how to aggregate TCP/UDP sessions into QoS flows. The most anticipated approach is that TCP/UDP sessions belonging to the same service are grouped together (e.g. one QoS flow for Google, one QoS flow for Facebook, etc); however, a finer classification is also possible when for instance different Google services will be mapped to different QoS flows. Such an approach with QoS flows was dictated by a need to address a number of real life cases and scenarios when the TCP/UDP sessions appear and disappear during the established protocol data unit (PDU) session, e.g. when different applications at the mobile phone start and establish connections.

At the same time, the radio interface of the NR/S5G technology still has radio bearers as in LTE. And it is also the RAN responsibility to perform mapping between the incoming QoS flows and radio bearers. Since the number of radio bearers on the RAN side is expected to be smaller than a potential number of QoS flows that the core network can address, it is also anticipated that RAN will map/group multiple QoS flows with same or similar characteristics into the same dedicated radio bearer.

As mentioned above, since multiple QoS flows could be mapped to the same radio bearer, the corresponding solutions should be introduced to support this mapping and convey the corresponding information associated with each QoS flow.

Overall Description of the New NR QoS Model

Firstly, the overall NR/5G QoS model can be viewed as two-level mapping, where the first level mapping is between the internet protocol (IP) flows and the second level mapping is between the QoS flow and the NR radio bearer.

It is worth noting that in DL two different entities perform traffic mapping into the QoS flows and data radio bearers (DRBs). The core network decides how TCP/UDP sessions will relate to QoS flows, while the RAN network will decide further which DRB will be used for each QoS flow.

On the contrary to it, the UL traffic mapping is done inside the UE, whereupon two potential approaches can be explored.

Figure 10A:
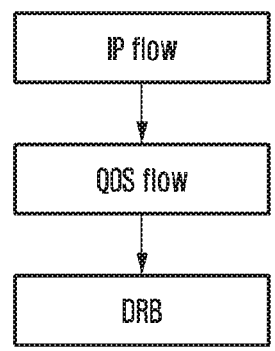
FIGS. 10a and 10b present two different mapping options for uplink (UL) quality of service (QoS)
Figure 10B:
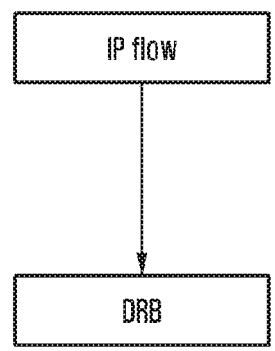

FIGS. 10a and 10b present two different mapping options for UL QOS.

The option of FIG. 10a will be referred to as "UL mapping 1," and the option of FIG. 10b will be referred to as "UL mapping 2." In "UL mapping 1," there is a two-step mapping approach similar to the one described for DL, i.e. IP flows are mapped first to the QoS flows, and subsequently QoS flows are mapped to DRB's. It is assumed that in this model, NAS signaling configures the IP flow→QoS flow mapping, and AS is responsible for configuring the QoS flow→DRB mapping. In "UL mapping 2," these two steps are merged into one step, i.e. the UE maps directly IP flows to DRB's. Even though both embodiments are feasible, the overall preference is for "UL Mapping 1" for the following reasons:

1. Consistency with DL mapping model
2. Allows simple decoupling of AS and NAS responsibilities. In other words, NAS responsible for IP flow→QoS flow mapping, and AS responsible for QoS flow→DRB mapping.
3. Consistent with reflective QoS handling. Reception of a DL packet results in updating of both UL mappings.
4. Enables independent updating of AS mapping Packet Marking for the New QoS Model It should be noted that even though preliminary solutions being considered for NR core network assume that a particular dedicated radio bearer can handle traffic belonging only to one PDU session, a more generic approach can be also considered when traffic from multiple PDU sessions can be multiplexed to the same DRB. It is expected that gateway (GW) handling in NR will become more and more flexible, i.e. the UE may be involved in parallel with more GW's than currently is the case in LTE. The following two examples illustrate when traffic from different GWs and PDU sessions could be multiplexed on the same DRB:

1. Enhanced mobile broadband (eMBB) web browsing traffic handled by a local GW with lower security requirements and more frequent IP address discontinuity. eMBB communication traffic (voice/video) handled by a GW further inside the operator network with stronger security requirements.
2. eMBB traffic handled by one GW. Ultra-reliable and low latency communication (URLLC) traffic handled by another GW.

Nevertheless, regardless of the fact whether traffic from different PDU sessions can be multiplexed to the same DRB or not, the absolute minimum requirement is that traffic from different QoS flows can be mapped to the same DRB.

Figure 11:
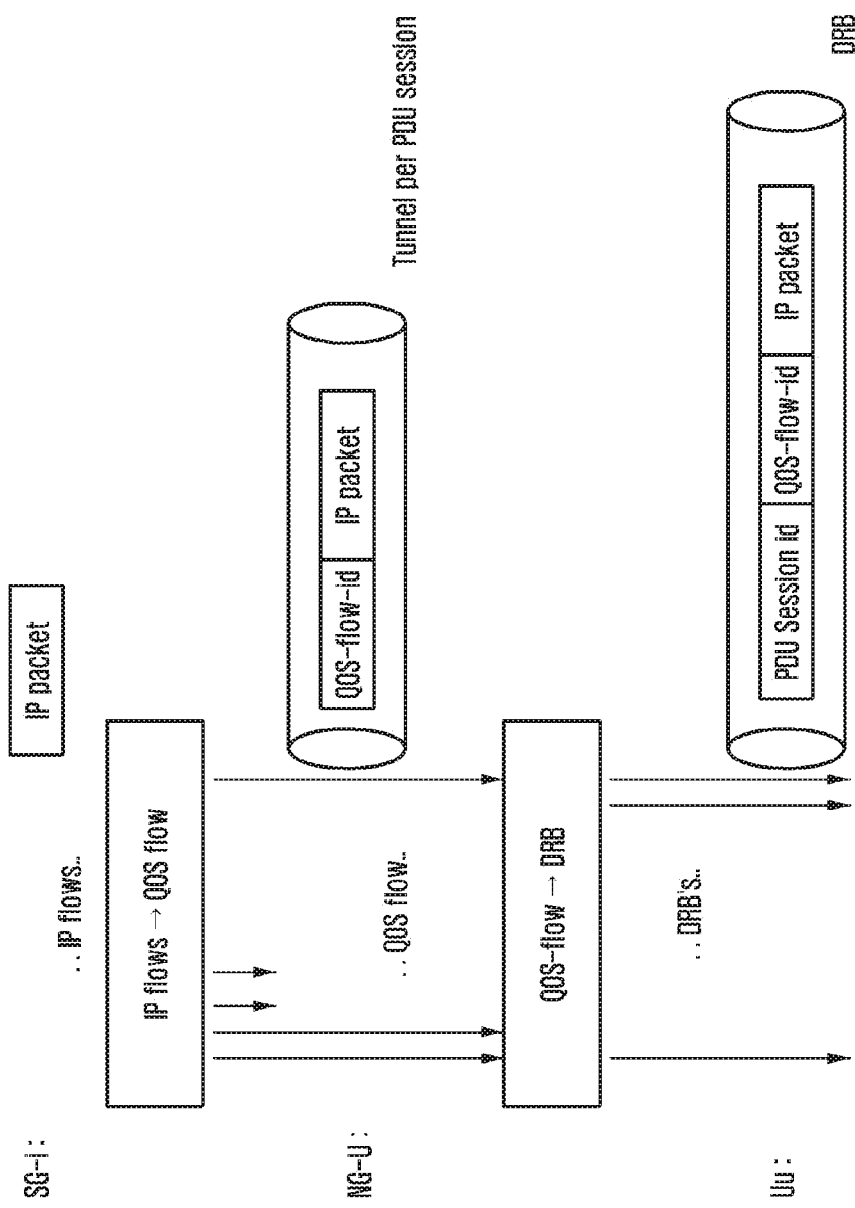
FIG. 11 presents downlink QoS model.

FIG. 11 presents downlink QoS model.

Referring to FIG. 11, for IP flow→QoS flow mapping, core network (CN) GW performs a packet marking/tagging based on DL traffic flow template (TFT). IP flow→QoS flow mapping results mapping (i.e. QoS flow ID) included in each DL packet over NextGen3 (NG3) between access network (AN) and user plane function (UPF).

In addition, RAN performs QoS flow→DRB mapping. Only RAN knows this mapping. QoS flow→DRB mapping results DRB's that are established. RAN is informed about QoS characteristics of QoS flow either by specification or dynamic by signaling over NG-C (QoS profiles), which is the control plane interface toward next generation core (NGC). Based on this the RAN can determine what DRB (existing or new) to best map the QoS flow to.

As can be seen from FIG. 11, it is proposed/assumed that in the most generic case, every DL packet is marked with a PDU session ID and the QoS flow ID. Of course, a particular embodiment can have only the QoS flow ID if traffic mixing from different PDU sessions is not allowed. Having PDU session/QOS flow ID marking in every DL packet will enable the UE AS to provide this information to the UE NAS in a simple way e.g. without having to use some form of UL TFT.

Figure 12:
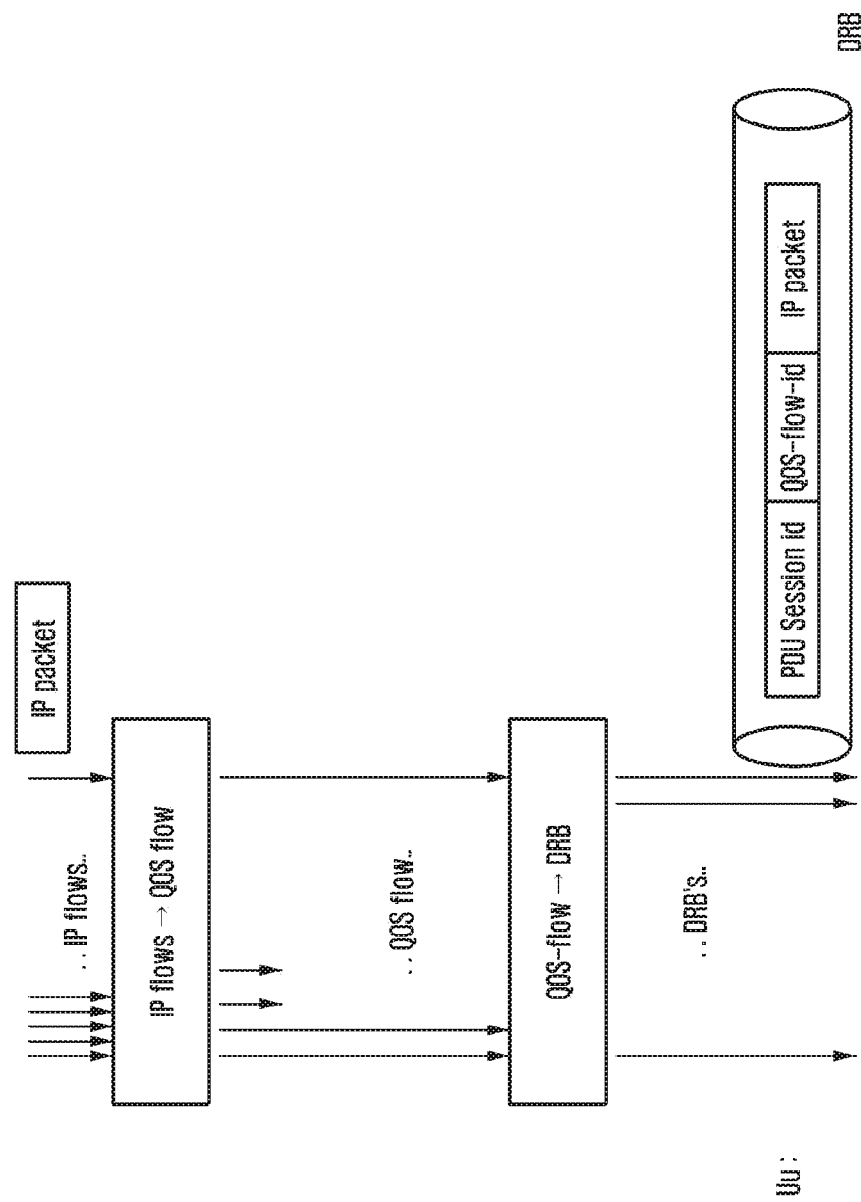
FIG. 12 presents uplink QoS model.

FIG. 12 presents uplink QoS model.

Referring to FIG. 12, for IP flow→QoS flow mapping, UE performs QoS flow ID mapping/tagging. NAS signaling configures UE with IP flow→QoS policy/QoS flow ID, i.e. UL TFT (e.g. at session establishment).

UE also performs QoS flow→DRB mapping. QoS flow→DRB mapping is configured by RAN with RRC, e.g. at DRB establishment. It should be noted that CN cannot perform this mapping since it is not aware of the DRB situation.

As for the UL traffic illustrated in FIG. 12, it is proposed that every UL packet can be marked with a PDU session ID and QoS flow ID, similarly to the considerations considered for the DL traffic. In short, this is required for the following reasons. PDU session ID marking is needed for those cases when traffic from several PDU sessions is multiplexed to the same DRB, and thus gNB must need to know how to route received packets to the correct NG-U tunnel without resorting to implement some form of additional traffic classifiers (NG-U is the user plane interface toward NGC). When traffic from multiple PDU sessions is not mixed to the same DRB, still the QoS flow ID is needed as gNB will forward this information to the core network.

Inclusion of "PDU session id" in DL packets over Uu may not be required if:

1. The concerning DRB is only handling one PDU session, or
2. The concerning packet is not used for reflective QoS, i.e. is not intended to trigger any UL IP flow allocation/mobility
3. Hence UE/AS multiplexing layer (ASML) does not expect PDU session ID to be included in the received packet for the above cases and expects to be included in the other cases. If included, UE/ASML forwards the relevant information (i.e. PDU session ID and IP address/UDP port number/QoS information etc.) to upper layer so that reflective QoS can be properly handled Inclusion of "QoS flow ID" in DL packets over Uu may not be required if:

1. The concerning DRB is only handling DL packets corresponding to one QoS flow, or
2. The concerning packet is not used for reflective QoS, i.e. is not intended to trigger any UL IP flow allocation/mobility
3. Hence UE/ASML does not expect QoS flow ID to be included in the received packet for the above cases and expects to be included in the other cases. If included, UE/ASML forwards the relevant information (i.e. QoS flow ID and IP address/UDP port number/QoS information etc.) to upper layer so that reflective QoS can be properly handled Inclusion of "PDU session ID" in UL packets over Uu may not be required if:
1. The concerning DRB is only handling one PDU session
2. Hence UE/ASML does not include PDU session ID in the packet to be transmitted if the concerning DRB carries/transmits data for only one PDU session.
3. If the concerning DRB carries/transmits data for more than one PDU session, UE/ASML includes PDU session ID in the packet to be transmitted Inclusion of "QoS flow ID" in UL packets over Uu may not be required if:
1. The concerning DRB is only handling UL packets corresponding to one QoS flow
2. Hence UE/ASML does not include QoS flow ID in the packet to be transmitted if the concerning DRB carries/transmits data for only one QoS flow.
3. If the concerning DRB carries/transmits data for more than one QoS flows, UE/ASML includes QoS flow ID in the packet to be transmitted Functional Model for the New NR QoS Framework FIGS. 13a and 3b show the new functionality for NR QoS handling on top of existing DRB functionality.

Figure 13A:
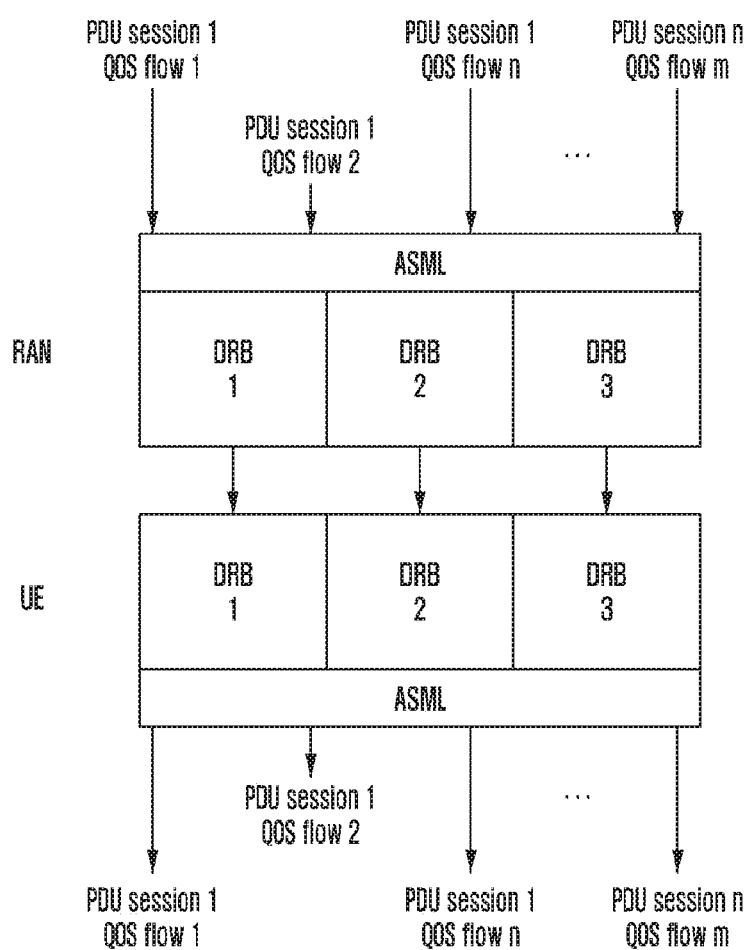

Referring to FIG. 13a illustrating a DL case, RAN performs mapping of QoS flows to DRB's, adds Uu tagging, and initiates on-the-fly DRB establishment. UE removes Uu tagging and informs NAS about PDU session ID and QoS flow ID for each received packet (for reflective QoS).

Figure 13B:
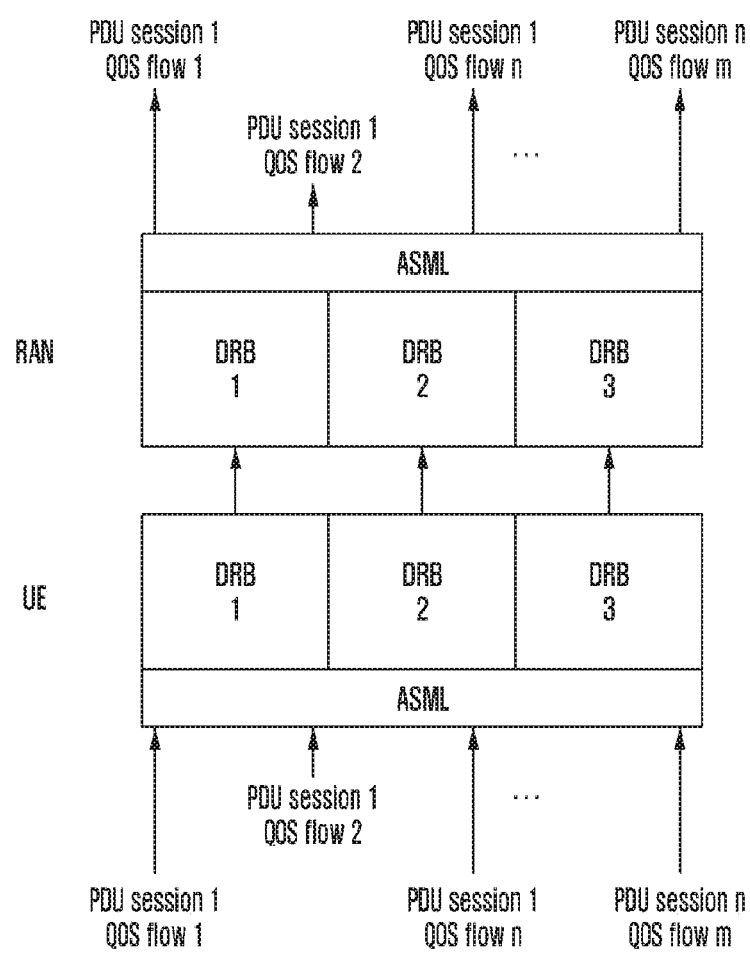

Referring to FIG. 13b illustrating a UL case, UE performs mapping of QoS flows to DRB's, adds Uu tagging, and initiates on-the-fly DRB establishment. RAN removes Uu tagging and performs mapping of QoS flows to correct PDU session tunnel over NG-U.

Figure 14:
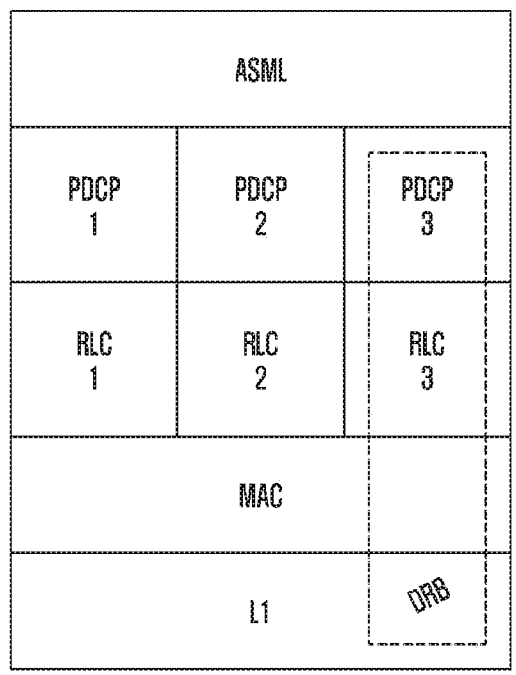
FIG. 14 shows an updated protocol stack with a new protocol layer.
Figure 15:
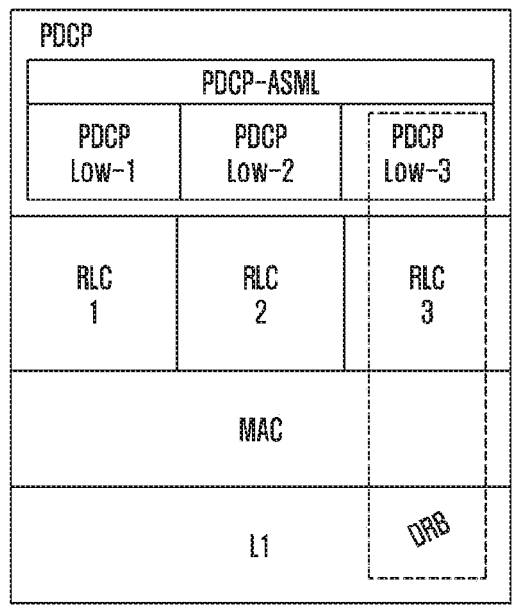
FIG. 15 shows access stratum multiplexing layer (ASML) functionality as a part (sublayer) in packet data convergence protocol (PDCP)

To model the new functionality supported by the AS UE protocol stack, there are two options shown in FIGS. 14 and 15, respectively.

FIG. 14 shows an updated protocol stack with a new protocol layer (hence referred to as AS multiplexing layer (ASML), which handles the new functionality. Note that ASML would be a non-DRB specific protocol entity, i.e. it should span over all the configured DRBs.

Referring to FIG. 14 showing a new user plane layer, it is possible to note that it has the following benefits: cleaner "DRB concept" e.g. PDCP entity still created at DRB establishment; the ASML entity (non-DRB specific) created at connection establishment; cleaner model for the dual-connectivity operation. As for the drawbacks, it is possible to mention more user plane layers and additional protocol header in every packet over Uu.

FIG. 15 shows the ASML functionality as a part (sublayer) in PDCP. Note that this means that PDCP is no longer a DRB specific entity, i.e. only the "PDCP-Low" sub-entity (which implements LTE PDCP functionality) would be DRB specific, but the PDCP-ASML sub entity is not DRB specific.

Referring to FIG. 15 illustrating a new ASML layer as a top sub-layer of PDCP, the following drawbacks can be pointed out: less clean "DRB concept," e.g. PDCP sub-entity created at DRB establishment, PDCP-ASML sub-entity (non-DRB specific) created at connection establishment, less tractable model in dual connectivity (DC) case. Concerning benefits, there will be fewer user plane layers, new fields (PDU session/QoS flow ID) transported as part of PDCP header.

Figure 16:
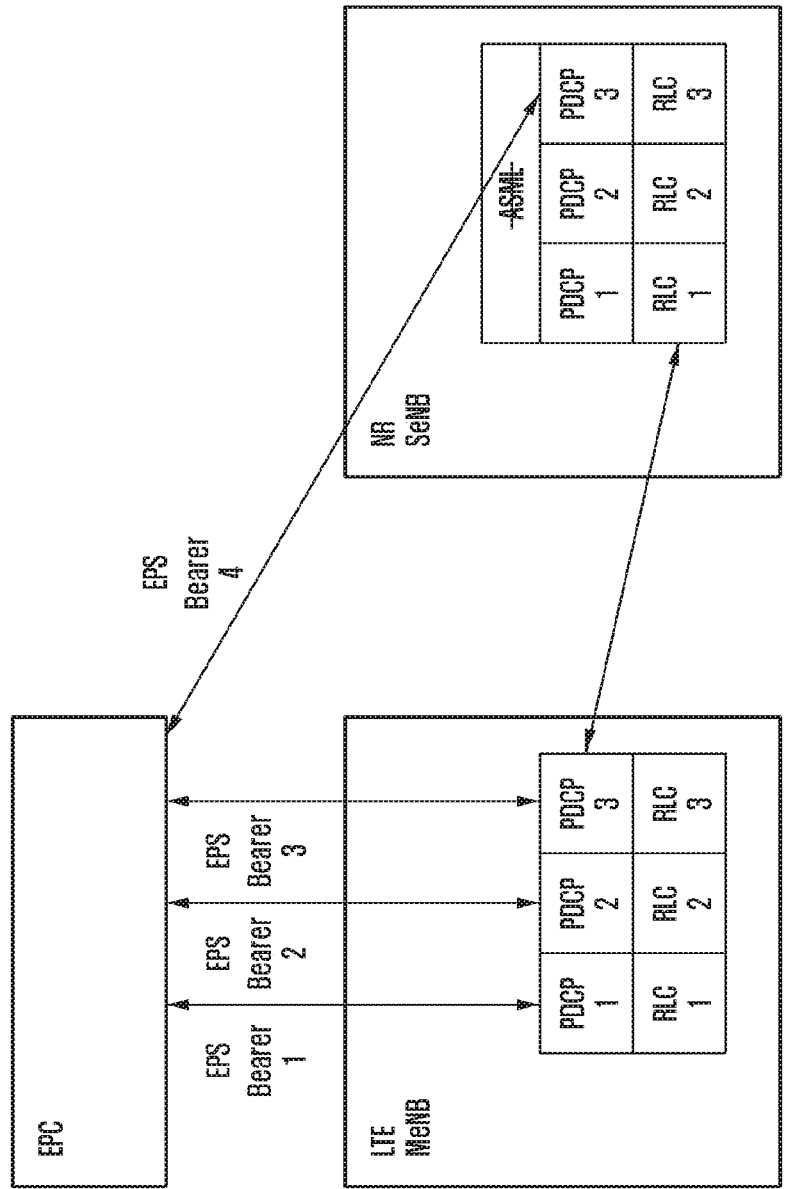
FIG. 16 presents tight interworking scenario between Long Term Evolution (LTE) and New Radio (NR)

FIG. 16 presents tight interworking scenario between LTE and NR, i.e. DC between LTE and NR.

Referring to FIG. 16, no mapping layer is needed in NR SeNB connected to EPC. As mentioned above, the option shown in FIG. 14 has the benefit of clean mapping with separate layer; i.e. ASML will just not be used in NR SeNB in this DC case.

Reflective QoS Indication

One of the additional features for the NR QoS model is a so-called reflective QoS operation, which allows for instantiation of the UL classification rule at the UE side without explicit RRC or the NAS level signalling. Its basic operation can be summarized as follows: the network sends the DL packet with the corresponding indicator, and upon reception of the packet with the indicator, the UE creates the UL classification rule with the corresponding IP address as the matching filter. It should be emphasized that since two-level mapping is assumed, the UL will create the UL traffic classification rule to map IP flow to the QoS flow, and will also create an entry for the QoS flow to DRB mapping.

It should be noted that a brute force approach for establishing and maintaining UL classification rules for the reflective QoS is that a UE monitors all the incoming packets and check/updates mapping rules for both AS and NAS level mapping. However, as NR data rates are expected to be as high as 20 Gbps, it would be a huge processing load for the UE to apply these actions for every incoming packet. Furthermore, it is also anticipated that reflective QoS mechanism will be used only upon TCP/UDP session establishment, i.e. the network will not (even though it can) perform constant IP flow re-mapping. Based on that, an explicit indicator in the ASML header is needed, presence of which would trigger the UE actions to check and update the mapping rules.

With regards to the indicator triggering update of mapping rules as elaborated in the previous paragraph, one could consider two potential embodiments, whereupon there could be either one indicator covering both AS and NAS mapping, or there could be two separate indicators.

Potential Header Formats

FIGS. 17a, 17b, 17c and 18 present potential ASML header formats conveying PDU session ID, QoS flow ID, and the reflective QoS indicators.

As can be seen for the figures, potential header structures may contain, but are not limited to, information on the PDU session ID and the QoS flow ID. Presence and format of the aforementioned fields is governed by the corresponding architectural decisions and/or the network configuration.

In addition, the ASML header may contain the reflective QoS indicator that, as elaborated earlier, will serve as indicator to the UE to check and updated, if needed, traffic classification rules.

Figure 17A:
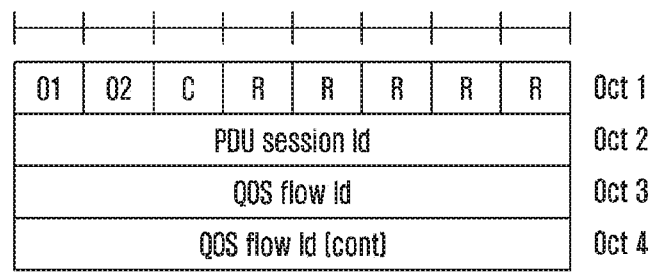
Figure 17B:
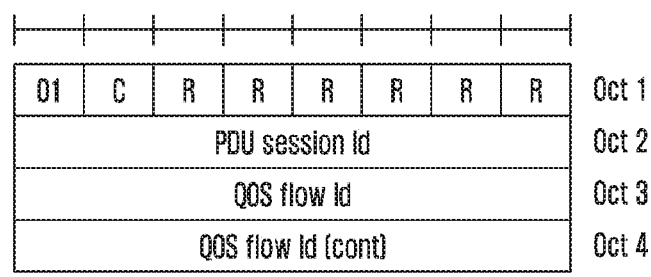

Specifically, FIGS. 17a, 17b and 17c present potential header formats for separate ASML protocol entity. Note that field sizes are only exemplary.

The potential header structure of FIG. 17a includes separate optionality indicators for fields "PDU session ID" and "QoS flow ID." The O1 field indicates presence of "PDU Session ID." The O2 field indicates presence of "QoS flow ID." The C field is for reflective QoS checking. The R field is a reserved field.

The potential header structure of FIG. 17b includes a common optionality indicator for fields "PDU session ID" and "QoS flow ID." The O1 field indicates presence of "PDU Session ID" and "QoS flow ID." The C field is for reflective QoS checking. The R field is a reserved field.

The potential header structure of FIG. 17c includes one optionality indicator for one combined field addressing both "PDU session ID" and "QoS flow ID." The O1 field indicates presence of "QoS ID," where the "QoS ID" has some mapping to "PDU Session Id" and "QoS flow ID". The C field is for reflective QoS checking. The R field is a reserved field.

Figure 18:
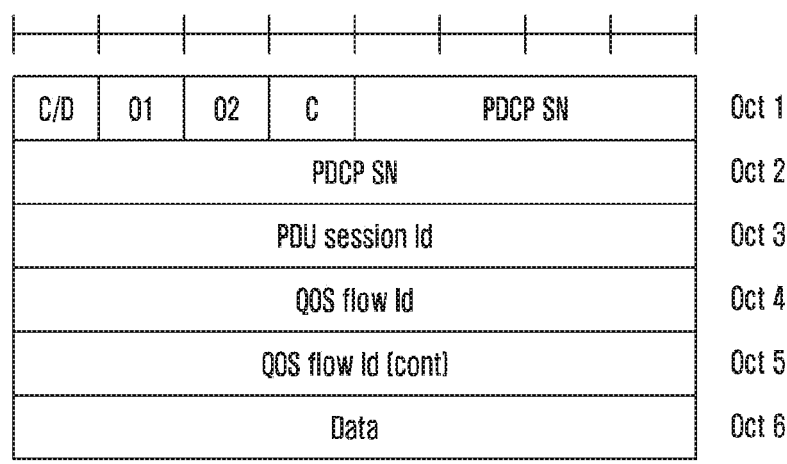

FIG. 18 presents a potential header format for ASML as PDCP sub-entity. Note that field sizes and ordering are only exemplary.

In principle same options exist as shown in FIGS. 17a, 17b and 17c, but now the different optionality indicators/field would be part of a PDCP header, and the new fields are also part of the PDCP PDU.

Referring to FIG. 18, the optionality indicators/fields are integrated into a PDCP user plane PDCP PDU with a 12-bit PDCP SN. The D/C field is a data/control PDU indication. The O1 field indicates presence of "PDU Session ID." The O2 field indicates presence of "QoS flow ID." The C field is for reflective QoS checking.

In accordance with an aspect of Embodiment 3, a method for two-level QoS mapping is provided. The first level mapping is performed between the IP flow and the QoS flow. The second level mapping is performed between the QoS flow and the DRB. The two-level mapping can be performed either independently by different entities, or it can be performed simultaneously by one entity. Mapping information between IP flow and QoS flow, and between QoS flow and DRB, can be updated independently by different signaling methods.

In accordance with another aspect of Embodiment 3, a new layer is introduced that ensures mapping between the QoS flow and DRB. A new layer is introduced as a completely new user plane layer. Alternatively, a new layer is considered as the upper part of the existing protocol layer. The new layer entity is automatically instantiated and deleted depending on its relationship to other protocol layers.

In accordance with another aspect of Embodiment 3, a new layer header conveying the corresponding information needed for the QoS model. The new layer header includes but not limited to: at least one of the PDU session ID, the QoS flow ID, or the reflective QoS indication. The PDU session ID and the QoS flow ID fields could be present or absent depending on the network configuration. The reflective QoS indicator may be a single indicator for both AS and NAS level mapping, or it could be two separate indicators. The network will set the reflective QoS indicator when packet classification rules need to be updated. A UE upon reception of the reflective QoS indicator will check and update if needed its reflective QoS mapping for AS and NAS layers.

Figure 19:
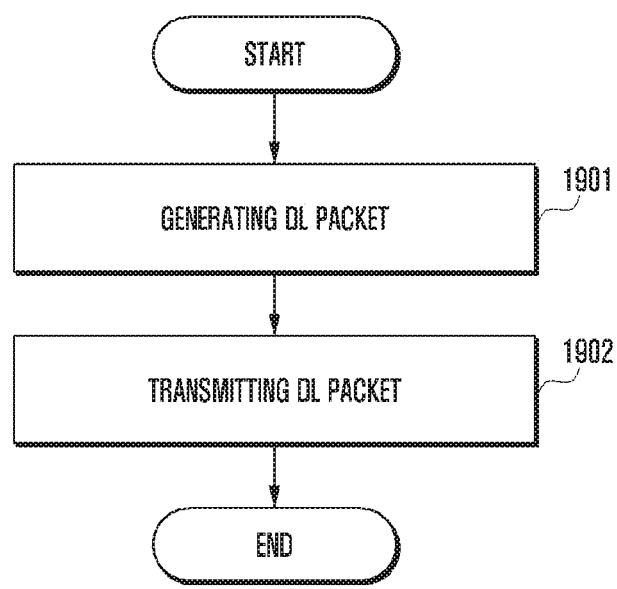
FIG. 19 illustrates a method of a base station for transmitting a downlink packet according to an embodiment of the present disclosure.

FIG. 19 illustrates a method of a base station for transmitting a downlink packet according to an embodiment of the present disclosure.

Referring to FIG. 19, a base station (i.e. eNB, gNB) generates a downlink packet including at least one of a PDU session ID or a QoS flow ID at operation 1901. As shown in FIGS. 17a, 17b, 17c and 18, the downlink packet may also include a reflective QoS indicator. The reflective QoS indicator can be separate for AS and NAS level mapping, or can correspond to both levels. The reflective QoS indicator may be set when packet classification rules need to be updated. The downlink packet may also include information on the PDU session ID and/or the QoS flow ID. The information on the PDU session ID and/or the QoS flow ID may include an indicator for presence of the PDU session ID and/or the QoS flow ID. Presence of PDU session ID and/or the QoS flow ID can be configured semi-statically by the network.

The base station transmits the generated downlink packet to a UE at operation 1902.

Figure 20:
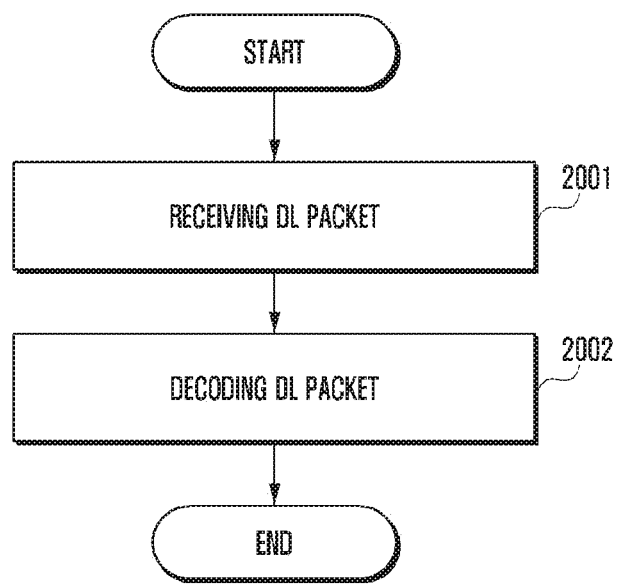
FIG. 20 illustrates a method of a UE for receiving a downlink packet according to an embodiment of the present disclosure.

FIG. 20 illustrates a method of a UE for receiving a downlink packet according to an embodiment of the present disclosure.

Referring to FIG. 20, a UE receives downlink packet including at least one of a PDU session ID or a QoS flow ID at operation 2001. The UE decodes the received downlink packet at operation 2002. As shown in FIGS. 17a, 17b, 17c and 18, the downlink packet may also include a reflective QoS indicator. The reflective QoS indicator can be separate for AS and NAS level mapping, or can correspond to both levels. The UE may update a reflective QoS mapping for AS and NAS layers based on the reflective QoS indicator. The downlink packet may also include information on the PDU session ID and/or the QoS flow ID. The information on the PDU session ID and/or the QoS flow ID may include an indicator for presence of the PDU session ID and/or the QoS flow ID. Presence of PDU session ID and/or the QoS flow ID can be configured semi-statically by the network.

Figure 21:
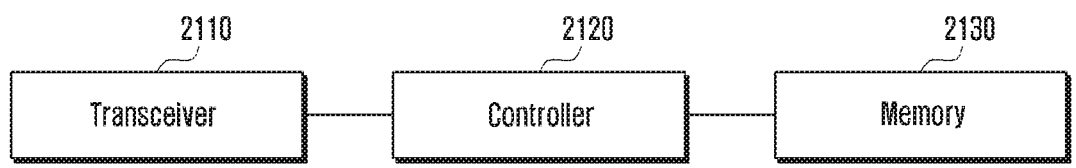
FIG. 21 is a block diagram of a base station according to an embodiment of the present disclosure.

FIG. 21 is a block diagram of a base station according to an embodiment of the present disclosure.

Referring to FIG. 21, a base station includes a transceiver (2110), a controller (2120) and a memory (2130). The controller (2120) may refer to a circuitry, an ASIC, or at least one processor. The transceiver (2110), the controller (2120) and the memory (2130) are configured to perform the operations of the base station, eNB or gNB illustrated in the figures, e.g. FIG. 6, 9 or 19, or described above. For example, the transceiver (2110) is configured to receive signals from a UE and transmit signals to the UE. The controller (2120) may be configured to generate a downlink packet including at least one of a PDU session ID or a QoS flow ID, and control the transceiver (2110) to transmit the generated downlink packet to the UE. The controller (2120) may be further configured to set a reflective QoS indicator when packet classification rules need to be updated.

Figure 22:
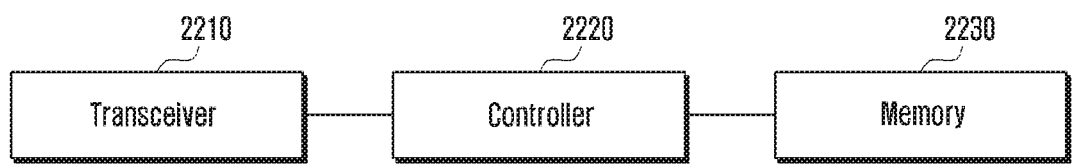
FIG. 22 is a block diagram of a UE according to an embodiment of the present disclosure.

FIG. 22 is a block diagram of a UE according to an embodiment of the present disclosure.

Referring to FIG. 22, a base station includes a transceiver (2210), a controller (2220) and a memory (2230). The controller (2220) may refer to a circuitry, an ASIC, or at least one processor. The transceiver (2210), the controller (2220) and the memory (2230) are configured to perform the operations of the UE illustrated in the figures, e.g. FIG. 20, or described above. For example, the transceiver (2210) is configured to receive signals from a base station and transmit signals to the base station. The controller (2220) may be configured to control the transceiver (2210) to receive a downlink packet including at least one of a PDU session ID or a QoS flow ID from the base station, and decode the received downlink packet. The controller (2220) may be further configured to update a reflective QoS mapping for AS and NAS layers based on a reflective QoS indicator.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method performed by a base station in a wireless communication system, the method comprising:
generating a header for a downlink packet, the header including an identifier associated with a quality of service (QoS) flow to which the downlink packet belongs and an indicator indicating whether a non-access stratum (NAS) for a user equipment (UE) is to be informed of an update to a QoS flow mapping rule;

transmitting, to the UE, the downlink packet with the header; and receiving, from the UE, an uplink packet mapped to the QoS flow to which the downlink packet belongs, in case that the QoS flow mapping rule is updated based on the indicator.

2. The method of claim 1, wherein the header for the downlink packet further includes a protocol data unit (PDU) session ID.

3. A base station in a wireless communication system the base station comprising:

a transceiver; and a controller configured to control to:

generate a header for a downlink packet, the header including an identifier associated with a quality of service (QoS) flow to which the downlink packet belongs and an indicator indicating whether a non-access stratum (NAS) for a user equipment (UE) is to be informed of an update to a QoS flow mapping rule;

transmit, to the UE via the transceiver, the downlink packet with the header; and receive, from the UE via the transceiver, an uplink packet mapped to the QoS flow to which the downlink packet belongs, in case that the QoS flow mapping rule is updated based on the indicator.

4. A method performed by a user equipment (UE) in a wireless communication system the method comprising:

receiving, from a base station, a downlink packet with a header, the header including an identifier associated with a quality of service (QoS) flow to which the downlink packet belongs and an indicator indicating whether a non-access stratum (NAS) for the UE is to be informed of an update to a QoS flow mapping rule;

determining whether the QoS flow mapping rule is updated based on the indicator; and transmitting, to the base station, an uplink packet mapped to the QoS flow to which the downlink packet belongs, in case that the QoS flow mapping rule is updated based on the indicator.

5. The method of claim 4, wherein the header for the downlink packet further includes a protocol data unit (PDU) session ID.

6. A user equipment (UE) in a wireless communication system, the UE comprising:

a transceiver; and a controller configured to control to:

receive, from a base station via the transceiver a downlink packet with a header, the header including an identifier associated with a quality of service (QoS) flow to which the downlink packet belongs and an indicator indicating whether a non-access stratum (NAS) for the UE is to be informed of an update to a QoS flow mapping rule;

determine whether the QoS flow mapping rule is updated based on the indicator;

transmit, to the base station, an uplink packet mapped to the QoS flow to which the downlink packet belongs, in case that the QoS flow mapping rule is updated based on the indicator.

\* \* \* \* \*